United States Patent
van Riel et al.

(10) Patent No.: US 7,516,291 B2
(45) Date of Patent: Apr. 7, 2009

(54) COOPERATIVE MECHANISM FOR EFFICIENT APPLICATION MEMORY ALLOCATION

(75) Inventors: Henri Han van Riel, Westford, MA (US); Adriaan D M van de Ven, Boekel (NL)

(73) Assignee: Red Hat, Inc., Raleigh, NC (US)

( * ) Notice: Subject to any disclaimer, the term of this patent is extended or adjusted under 35 U.S.C. 154(b) by 195 days.

(21) Appl. No.: 11/164,393

(22) Filed: Nov. 21, 2005

(65) Prior Publication Data
US 2007/0118712 A1    May 24, 2007

(51) Int. Cl.
G06F 12/00    (2006.01)
(52) U.S. Cl. ............................ 711/170; 711/E12.006; 711/E12.009; 718/104
(58) Field of Classification Search .............. 711/170
See application file for complete search history.

(56) References Cited

U.S. PATENT DOCUMENTS

| | | | |
|---|---|---|---|
| 5,109,336 A * | 4/1992 | Guenther et al. ............ 711/171 |
| 5,159,678 A * | 10/1992 | Wengelski et al. .......... 711/153 |
| 5,301,328 A | 4/1994 | Begur et al. |
| 5,463,589 A | 10/1995 | Gruender et al. |
| 5,564,033 A | 10/1996 | Takekuma et al. |
| 5,696,927 A * | 12/1997 | MacDonald et al. ........ 711/207 |
| 5,713,006 A | 1/1998 | Shigeeda |
| 5,724,553 A | 3/1998 | Shigeeda |
| 5,729,710 A | 3/1998 | Magee et al. |
| 5,737,764 A | 4/1998 | Shigeeda |
| 5,737,765 A | 4/1998 | Shigeeda |
| 5,752,063 A | 5/1998 | DeRoo et al. |
| 5,754,764 A | 5/1998 | Davis et al. |
| 5,765,205 A * | 6/1998 | Breslau et al. ............ 711/203 |
| 5,784,697 A | 7/1998 | Funk et al. |
| 5,813,042 A | 9/1998 | Campbell et al. |
| 5,835,959 A | 11/1998 | McCool et al. |
| 5,870,756 A | 2/1999 | Nakata et al. |

(Continued)

OTHER PUBLICATIONS

IBM; "TXSeries for Multiplatforms: Application Programming Reference"; Dec. 1999; pp. 90-93.*

(Continued)

*Primary Examiner*—Matt Kim
*Assistant Examiner*—Michael C Krofcheck
(74) *Attorney, Agent, or Firm*—MH2 Technology Law Group LLP

(57) ABSTRACT

System, method and computer program product for allocating physical memory to processes. The method includes enabling a kernel to free memory in a physical memory space corresponding to arbitrarily sized memory allocations released by processes or applications in a virtual memory space. After freeing the memory, the system determines whether freed physical memory in the physical memory space spans one or more fixed size memory units (e.g., page frames). The method further includes designating a status of the one or more page frames as available for reuse; the freed page frames marked as available for reuse being available for backing a new process without requiring the kernel to delete data included in the freed memory released by the process. The kernel may organize pages marked as available for reuse in one or more local "pools" that is organized according to a variety of schemes which provide system efficiencies in that the kernel can eliminate the need for deleting of old data in those page frames without compromising data security.

22 Claims, 10 Drawing Sheets

U.S. PATENT DOCUMENTS

| | | | |
|---|---|---|---|
| 5,895,480 A | 4/1999 | Yung et al. | |
| 5,918,249 A | 6/1999 | Cox et al. | |
| 5,930,828 A | 7/1999 | Jensen et al. | |
| 5,941,961 A | 8/1999 | Nakahara | |
| 5,978,892 A | 11/1999 | Noel et al. | |
| 6,009,495 A | 12/1999 | DeRoo et al. | |
| 6,023,712 A | 2/2000 | Spear et al. | |
| 6,078,990 A | 6/2000 | Frazier | |
| 6,141,722 A * | 10/2000 | Parsons | 711/2 |
| 6,167,490 A | 12/2000 | Levy et al. | |
| 6,185,629 B1 | 2/2001 | Simpson et al. | |
| 6,202,134 B1 | 3/2001 | Shirai | |
| 6,205,528 B1 | 3/2001 | Kingsbury et al. | |
| 6,240,497 B1 | 5/2001 | Yagi | |
| 6,260,120 B1 | 7/2001 | Blumenau et al. | |
| 6,334,175 B1 | 12/2001 | Chih | |
| 6,336,176 B1 | 1/2002 | Leyda et al. | |
| 6,370,631 B1 | 4/2002 | Dye | |
| 6,381,685 B2 | 4/2002 | Dell et al. | |
| 6,385,711 B1 | 5/2002 | Colligan | |
| 6,463,515 B1 | 10/2002 | Stedman et al. | |
| 6,477,614 B1 | 11/2002 | Leddige et al. | |
| 6,496,916 B1 | 12/2002 | Fadavi-Ardekani et al. | |
| 6,523,102 B1 | 2/2003 | Dye et al. | |
| 6,549,959 B1 | 4/2003 | Yates et al. | |
| 6,584,554 B1 | 6/2003 | Dahlen et al. | |
| 6,646,646 B2 | 11/2003 | Peterson et al. | |
| 6,684,313 B2 | 1/2004 | Voigt et al. | |
| 6,701,420 B1 | 3/2004 | Hamilton et al. | |
| 6,718,450 B2 | 4/2004 | Hironaka | |
| 6,718,451 B2 | 4/2004 | Lawton et al. | |
| 6,754,771 B2 | 6/2004 | Vincent | |
| 6,804,763 B1 | 10/2004 | Stockdale et al. | |
| 6,826,657 B1 | 11/2004 | Ware et al. | |
| 6,879,266 B1 | 4/2005 | Dye et al. | |
| 6,883,079 B1 | 4/2005 | Priborsky | |
| 6,912,637 B1 | 6/2005 | Herbst | |
| 6,920,494 B2 | 7/2005 | Heitman et al. | |
| 6,941,437 B2 | 9/2005 | Cook et al. | |
| 2001/0018731 A1 | 8/2001 | Fujii et al. | |
| 2001/0044878 A1 | 11/2001 | Ando et al. | |
| 2001/0049768 A1 | 12/2001 | Kato et al. | |
| 2001/0054131 A1 | 12/2001 | Alvarez et al. | |
| 2002/0059507 A1* | 5/2002 | Hironaka | 711/170 |
| 2002/0091905 A1 | 7/2002 | Geiger et al. | |
| 2002/0144173 A1 | 10/2002 | Jeddeloh | |
| 2002/0152357 A1 | 10/2002 | Takahashi et al. | |
| 2002/0156973 A1 | 10/2002 | Ulrich et al. | |
| 2002/0156974 A1 | 10/2002 | Ulrich et al. | |
| 2002/0156975 A1 | 10/2002 | Staub et al. | |
| 2002/0161973 A1 | 10/2002 | Ulrich et al. | |
| 2002/0174295 A1 | 11/2002 | Ulrich et al. | |
| 2002/0174296 A1 | 11/2002 | Ulrich et al. | |
| 2003/0037178 A1 | 2/2003 | Vessey et al. | |
| 2003/0101325 A1 | 5/2003 | Desoll et al. | |
| 2003/0126393 A1 | 7/2003 | Tanaka | |
| 2003/0126394 A1 | 7/2003 | Fowler | |
| 2003/0145185 A1 | 7/2003 | Lawton et al. | |
| 2003/0177332 A1 | 9/2003 | Shiota | |
| 2003/0196062 A1 | 10/2003 | Valentin et al. | |
| 2004/0088498 A1* | 5/2004 | Accapadi et al. | 711/147 |
| 2004/0123026 A1 | 6/2004 | Kaneko | |
| 2004/0172506 A1 | 9/2004 | Gotoh et al. | |
| 2004/0177228 A1 | 9/2004 | Leonhardt et al. | |
| 2004/0193827 A1 | 9/2004 | Mogi et al. | |
| 2004/0221120 A1 | 11/2004 | Abrashkevich et al. | |
| 2004/0221122 A1 | 11/2004 | Chen et al. | |
| 2004/0255145 A1* | 12/2004 | Chow | 713/200 |
| 2004/0260864 A1 | 12/2004 | Lee et al. | |
| 2004/0260909 A1 | 12/2004 | Lee et al. | |
| 2004/0268049 A1 | 12/2004 | Madter | |
| 2005/0010739 A1* | 1/2005 | Rozas et al. | 711/207 |
| 2005/0015548 A1 | 1/2005 | Horst | |
| 2005/0044315 A1 | 2/2005 | Greco et al. | |
| 2005/0066112 A1 | 3/2005 | Osakabe et al. | |
| 2005/0066143 A1 | 3/2005 | Schop | |
| 2005/0071595 A1 | 3/2005 | Irish et al. | |
| 2005/0114620 A1 | 5/2005 | Justen | |
| 2005/0154850 A1 | 7/2005 | Collins | |
| 2005/0160220 A1 | 7/2005 | Bruner et al. | |
| 2005/0172096 A1 | 8/2005 | Van Heesch et al. | |
| 2005/0187935 A1* | 8/2005 | Kumar | 707/9 |
| 2005/0188163 A1* | 8/2005 | Asthana | 711/159 |
| 2005/0198464 A1 | 9/2005 | Sokolov | |
| 2005/0216615 A1* | 9/2005 | Nakashima et al. | 710/22 |
| 2005/0257019 A1 | 11/2005 | He | |
| 2006/0015872 A1* | 1/2006 | Pohl et al. | 718/100 |
| 2006/0117048 A1* | 6/2006 | Thind et al. | 707/101 |

OTHER PUBLICATIONS

Cranor, Charles D.; "The Design and Implementation of the UVM Virtual Memory System"; Jul. 1998; pp. 15-16.*
IBM; "AIX Version 4.3 Base Operating System and Extensions Technical Reference"; Oct. 1997, vol. 1.*
Ts'o, Theodore; "Linux 0.11 malloc.c" (source code); Nov. 1991.*
Knuth, Donald E.; "The Art of Computer Programming"; 1973; pp. 435-452.*
Berger, et al.; "Composing High-Performance Memory Allocators"; Jan. 2001.*
Berger, et al.; "Hoard: A Scalable Memory Allocator for Multithreaded Applications"; Nov. 2000.*
IBM; "TXSeries for Multiplatforms . . . "; Dec. 1999; p. 90-93.
Theodore Ts'o; "Linux 0.11 malloc.c" (Source Code); Nov. 1991.
IBM; "Disclaim Subroutine"; AIX v4.3 OS and Exts Technical Reference; Oct. 1997.
US Patent #5,159,678; Oct. 27, 1992; Supercompter Systems (Assignee).
Berger, et al; "Hoard: A Scalable Memory Allocator"; Nov. 2001.
Berger, et al; "Composing High Performance Memory Allocators"; Jan. 2001.
Charles Cranor; "The Design and Implementation of the UVM . . . "; Jul. 1998.
Knuth; "Fundamental Algorithms"; 1973.
Notification of Transmittal of the International Search Report and the Written Opinion of the International Searching Authority, or the Declaration, International Application No. PCT/US06/61087, Mar. 14, 2008, 10 Pages.

* cited by examiner

ALLOCATION GRANULARITY

COOPERATIVE MECHANISM FOR EFFICIENT APPLICATION MEMORY ALLOCATION

BACKGROUND OF THE INVENTION

1. Field of Invention

The present invention relates generally to techniques for increasing performance efficiencies of memory management techniques in computing environments, and particularly to methods for more efficiently executing memory allocations and frees between the native system libraries and the (operating system) kernel providing for improved utilization of memory-space in a manner transparent to user programs.

2. Description of Prior Art

Generally, computer systems can be thought of having two types of memory, operating system memory (or kernel mode memory) and user memory, the kernel memory comprising that portion of memory utilized for operating system execution including basic functions as physical memory management and controlling execution of one or more user programs or processes; and, a user memory (comprising a logical address or user space) where user programs, processes and/or data operate.

Before a CPU can execute a program, the user's memory has to be loaded into a physical address space; that is, so it may be directly accessed by the CPU for execution. Additionally, all logical addresses must be mapped to produce physical addresses that the operating system tracks. Thus, a program generated address or "logical address" consisting of a logical page number plus a location within that page is interpreted or "mapped" onto an actual (physical) main memory address by the operating system using a mapping or address translation function. As known, this function is typically embodied as a page table including associative registers and/or translation lookaside buffers (TLBs) that facilitate the retrieval of a physical address corresponding to a logical page and, that includes an access code (e.g., one or more "dirty" bits) to indicate its presence in main memory. If the page is present in the main memory, the mapping mechanism substitutes a physical page frame number for the logical number. If the mapping mechanism detects that the page requested is not present in main memory, a "fault" occurs and the page must be read into a frame in main memory from a secondary storage device.

Furthermore, the operating system typically keeps a table indicating which parts of memory are available and which are occupied. In dynamic storage allocations schemes, when a user process arrives, typically a C library function is implemented to allocate as much memory as is needed to run the process. When a process is allocated space, it is loaded into user memory and can then compete for the CPU processing; and when a process terminates, the memory is released or freed which the O/S can fill with another process. Typically, computer systems implement a partitioning approach whereby the physical memory comprises fixed-size memory blocks, e.g., frames, with memory units, i.e., pages, allocated based on block size. Thus, when a process is to be executed, its pages are loaded in available memory frames. Memory frames and pages sizes may range from between 512 bytes to 16 Mbytes, with typical architectures supporting memory frame sizes of 4 kB or 8 kB.

It is often the case that the memory requirements of a process do not coincide with page boundaries, e.g., a physical memory frame allocated will not be completely frill leading to an internal fragmentation condition. This is illustrated in FIG. 1A illustrating the granularity of example physical memory allocations requested of the kernel by a C library function for user processes in fixed size memory page frames of 4 kBytes for example. Thus, as shown in FIG. 1A, an executing user process has been allocated three (3) 200 bytes memory portions 12, for example, that are mapped to a memory page 10. As shown the frame is not completely filled (an internal fragmentation condition). In another instance, as shown in FIG. 1A, a process has been allocated a 400 byte memory portion 22 mapped to a page frame 20. However, in this instance, the same process has allocated additional memory 32, e.g., of 5 kBytes in length, that is mapped in part to page frame 20 and the remainder to a second page frame 30. Thus, in this instance, the page frame 20 shares another memory allocation for the same process. The portion of the allocated memory portion 32 not stored in page frame 20, is mapped to memory frame 30. In the last example shown in FIG. 1A, a process 42, for example, has been allocated memory 42 of 10 kB and is mapped to page frames 40, 50 and 60. It is understood that, of allocations 12, 22, 32, 42 shown in FIG. 1A may be attributed to a single process.

It is the case that physical memory page frames that share memory allocations, e.g., page frame 20, can only be recycled as free memory when both of the user memory allocations are freed, i.e., released by a C library system call to the kernel. The O/S tracks the freed memory in a "Global" free page pool. Thus, the kernel must check if there are any other allocations remaining in the same page before it can put the page out for recycling.

FIG. 1B shows an example instance of pages 20 and 30 marked as recyclable pages 25 and 35 using a function MADVISE_DONTNEED, or equivalent function call, which indicates to the kernel that the page can be immediately reused, e.g., either by the same process, or any other process sharing the memory pool.

Currently, it is necessary in the memory allocation and freeing implementations described, that the data in recycled memory pages be "cleaned out" for security purposes—typically by having the kernel "zero out" the memory page, which is a processing overhead. That is, data resident in recycled memory pages must be zeroed in order to prevent one user from seeing the memory used by another user. However, in an attempt to avoid multiple free and clean cycles (e.g., between the C library and O/S), it is desirable to prevent the freeing of memory pages back to the operating system global free page pool.

It would be highly desirable to provide modifications to the O/S system kernel and system library memory allocation and freeing routines that create efficiencies when an application (through a system library call) allocates new memory for processes.

It would be highly desirable to provide modifications to the O/S system kernel and system library memory allocation and freeing routines while preventing users from seeing another user's confidential data when a memory page is allocated having data previously stored at that memory page by a prior process.

It would be further highly desirable to provide modifications to the O/S system kernel and system library memory allocation and freeing routines by creating one or more types of free memory page "pools" and using these pools to reduce the overhead of allocating memory pages to processes.

BRIEF SUMMARY OF THE INVENTION

The present invention addresses the above and other issues by providing a technique for creating efficiencies when an application (through a system library call) allocates new memory for processes.

The method includes enabling a kernel to free memory in a physical memory space corresponding to memory allocations released by processes in a virtual memory space. After freeing the memory, the system determines whether freed physical memory in the physical memory space spans one or more fixed size memory units (e.g., page frames). The method further includes designating a status of the one or more page frames as available for reuse; the freed page frames marked as available for reuse being available for backing new processes without requiring the kernel to delete data included in the freed memory released by the process.

In one aspect of the invention, a system, method and computer program product is provided for allocating memory freed by applications in a computer system. The method provides the O/S (kernel) with the ability to track and allocate physical memory corresponding to memory released by processes in virtual memory space. After a process releases memory in virtual memory space, the system determines whether the memory released space spans one or more fixed size memory units (e.g., page frames). For each page frame worth of memory released by that process, the kernel designates a status of that page frame as available for reuse, i.e., available for backing the same process (or even new processes satisfying some criteria, e.g., same security context) without requiring the kernel to delete data included in the freed memory released by the process.

Further to this, the kernel may organize pages marked as available for reuse in one or more local freed page "pools" organized according to a variety of schemes which provide system efficiencies in that the kernel can skip the need for deleting of old data in those page frames without compromising data security. That is, the process that allocated the memory may look at the previous data stored in these page frames without security implications. This is particularly advantageous when the kernel has marked memory page(s) as available for reuse, that same process may have immediate access to that page(s) again, without having to incur the system overhead of allocating a new page.

For example, the one or more pools are organized according to one or more criteria including, but not limited to: a process, a user, a security class or context, a processor, an applications node's status as being a Non-Uniform Memory Access (NUMA) node, or, a memory zone where fixed size freed memory units are made available, or combinations thereof.

In accordance with these aspects of the invention, an enhancement to the allocation routines is provided such that a process may obtain from the kernel the same page that is marked as available for reuse—thus, the kernel does not have to zero out the memory and the overhead associated with recycling the available page. That is, rather than recycling a page when no longer needed by a process, the kernel records the page as available for reuse; thus, the same process (or process of like security class) can avoid the need to require the kernel to immediately allocate one or more new pages. In this manner, a computer system will incur additional savings by not having to make perform the memory allocations if the system is running short of memory, as the kernel will know it is able to use the free available memory pages marked as available for reuse.

Accordingly, there is provided functionality in computing system library function calls implemented for freeing portions of user memory for determining whether the recently freed memory spans a whole page frame, or multiple page frames. Alternatively, or in addition, it is possible that the recently freed memory, combined with memory freed earlier, spans a whole page frame and the system library functions will make such determination. For all the entirely free page frames in the memory, the system library functions inform the kernel that the memory is free through a system call.

The modifications to the system library functions are necessary so that memory allocation efficiencies occur transparent to user programs, and because of the fact that memory allocations and frees between the C library and the OS are in multiples of the page frame size, while memory allocations and frees at the application level happen in arbitrarily sized portions.

In another aspect, there is provided a system, method and computer program product that provides the kernel with the availability to use page frames from a system-wide (global) free memory list if there are no page frames available in a suitable local "freed page" pool. Any data in this memory will have to be deleted, for security purposes. Moreover, if the system-wide free memory list is empty, the page out code may first reclaim pages from the local "free" pages pool, before falling back to paging out data from occupied page frames. The kernel may further take into account a variety of criteria when choosing from which local "freed pages" pool(s) to reclaim page frames.

In this manner, when an old process requires allocation of user memory and there is none available, the kernel can use a least recently released page (a first process released) without having to search through memory for a page(s) to swap out. This way, the time overhead that a first process would incur when a memory is freed and is placed in a global free pool and has to be cleaned before it can go back to the process—is eliminated. Further, a space overhead has been eliminated as a program does not have to give memory back to the system, i.e., the system does not know which memory is actually in use (which memory the program is opportunistically holding on to) and that means that the system could have to swap something out in order to run other requesting processes.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE INVENTION

Figure 1A:
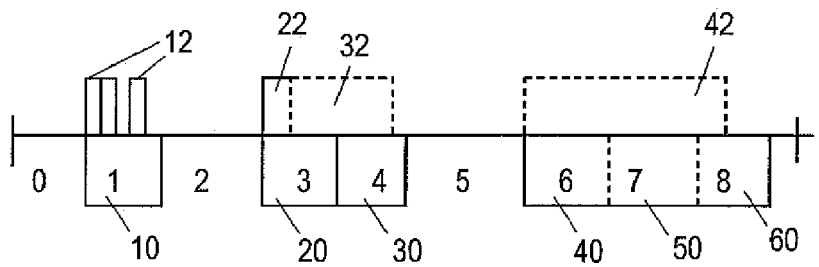
FIGS. 1A and 1B illustrate a computer system architecture implementing memory allocation scenarios in accordance with the prior art.
Figure 1B:
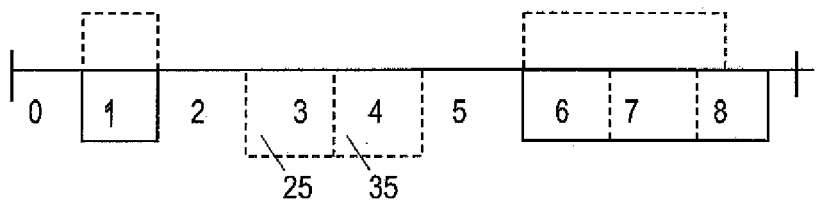
Figure 2:
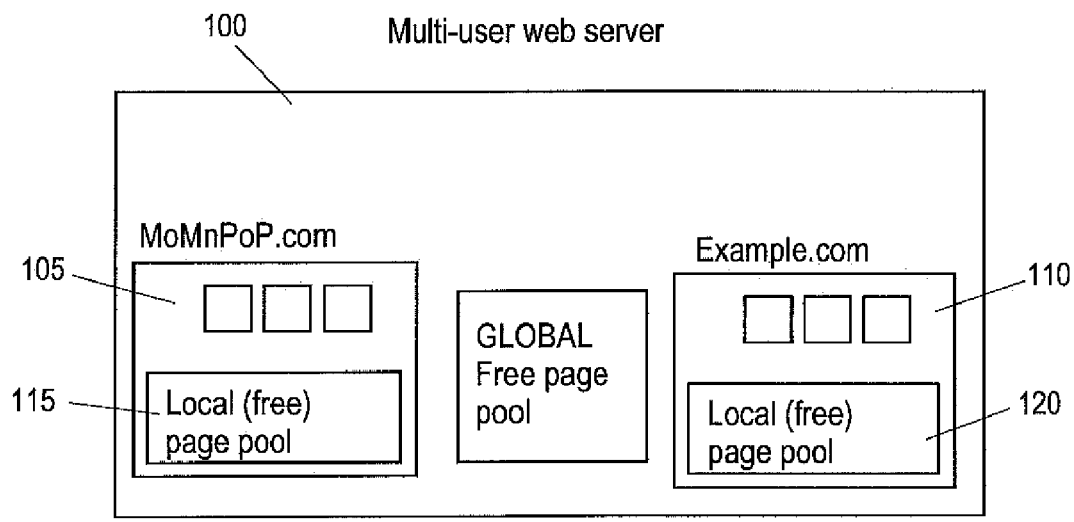
FIG. 2 illustrates a computer system architecture in the form of an exemplary multi-user web server adapted for implementing the memory allocation efficiencies according to the present invention.

FIG. 2 illustrates by way of example, a computer system architecture for implementing the memory allocation efficiencies according to the various embodiments of the present invention. In FIG. 2, implementation of the present invention is described in the context of an example multi-user web server 100 executing programs (e.g., web server applications or processes 105, 110) in a virtualized computing environment. As will be described in greater detail herein, according to the invention, the web server computer system architecture is implemented with system library and O/S kernel enhancements for defining and tracking one or more local free pools 115, 120 respectively, that comprise page frames that have been "freed" by a process, without the overhead of recycling. The computer system architecture 100 depicted further includes a Global Free Page pool for indicating availability of recycled pages as known in prior art implementations. It is understood that the invention may be employed in a variety of computer system architectures and platforms and is applicable to conceivably any type of operating system that may run on such architectures including single- or multi-processor machines having main memory and hard disk space. Further, the invention may run on platforms executing Window®, UNIX, or Linux-based operating systems. For purposes of description, the computing system of FIG. 2 comprises a platform executing a Linux operating system that is compliant with POSIX standards for specifying certain aspects of operating system behavior including process threads and real-time allocations. Such a system further includes shared system libraries, such as a C-library, that provides a portion of the system-call interface for Linux through which applications interface with the kernel. One such C-library system-call to the O/S is invoked to control dynamic memory page allocations, including allocating and freeing physical memory pages or ranges of pages in fixed size memory pages, and allocating ranges of physically continuous pages on request. It is further understood that a memory-management subsystem implemented (e.g., page-table mapping mechanism, translation look-aside buffers, etc.) may allocate to a process arbitrary-sized memory units smaller than a page, such that, at the process level, memory allocations and frees occur in arbitrarily sized portions.

Figure 3:
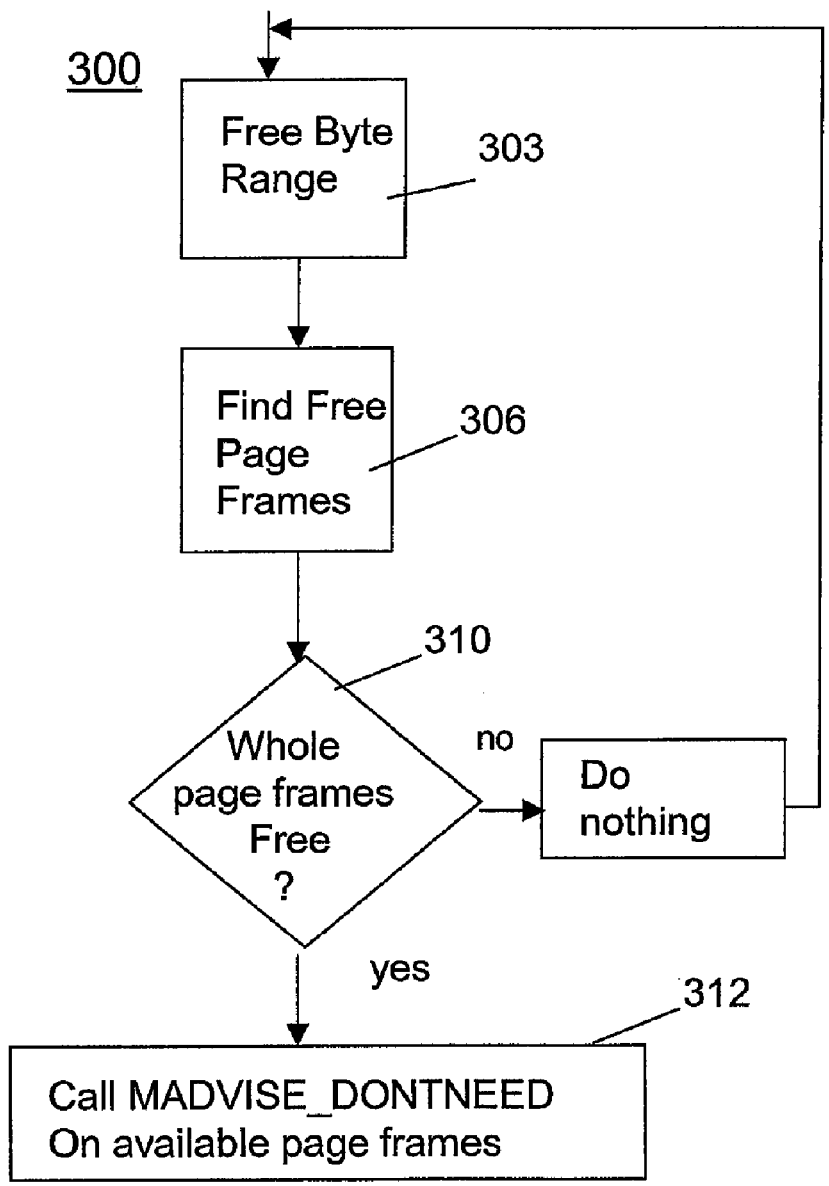
FIG. 3 depicts a flow chart of the process 300 implemented by the C library method call, e.g., a memory freeing routine, according to the present invention.

According to the invention, when deallocating or freeing partitions of virtual memory, rather than recycling a page when no longer needed by a process, e.g., when the process terminates, the kernel initiates marking of the pages as available for reuse by that process. FIG. 3 depicts a flow chart of the process 300 implemented by the C library system call, e.g., a memory freeing routine, according to the present invention. In a first step 303, the kernel has responded to the system call for freeing the byte range associated with the terminating process. After freeing the byte range associated with a terminating process, at step 306, the C library determines whether the recently freed memory spans a whole page frame, or multiple whole page frames. For example, it is possible that the recently freed memory, combined with memory freed earlier by the same process, spans one or more whole page frames. Thus, at step 310, a determination is made as to whether the freed memory spans a whole page frame, or multiple page frames. If the amount of bytes that were relinquished by the process does not span a whole page frame, then the system waits for further memory bytes to be freed. Otherwise, at step 310, if the amount of bytes that were relinquished by the process spans a whole or multiple page frames, then the process continues at step 312 where the C library informs the kernel that this memory is free. This may be accomplished through a system call like POSIX madvise (MADVISE_DONTNEED), or equivalent interface that specifies that the application that is freeing the memory byte range expects that it will not access the specified range in the near future. As known, this POSIX memory advisory information includes attributes of the freed data range such as a starting virtual memory address and a length in bytes.

Figure 4A:
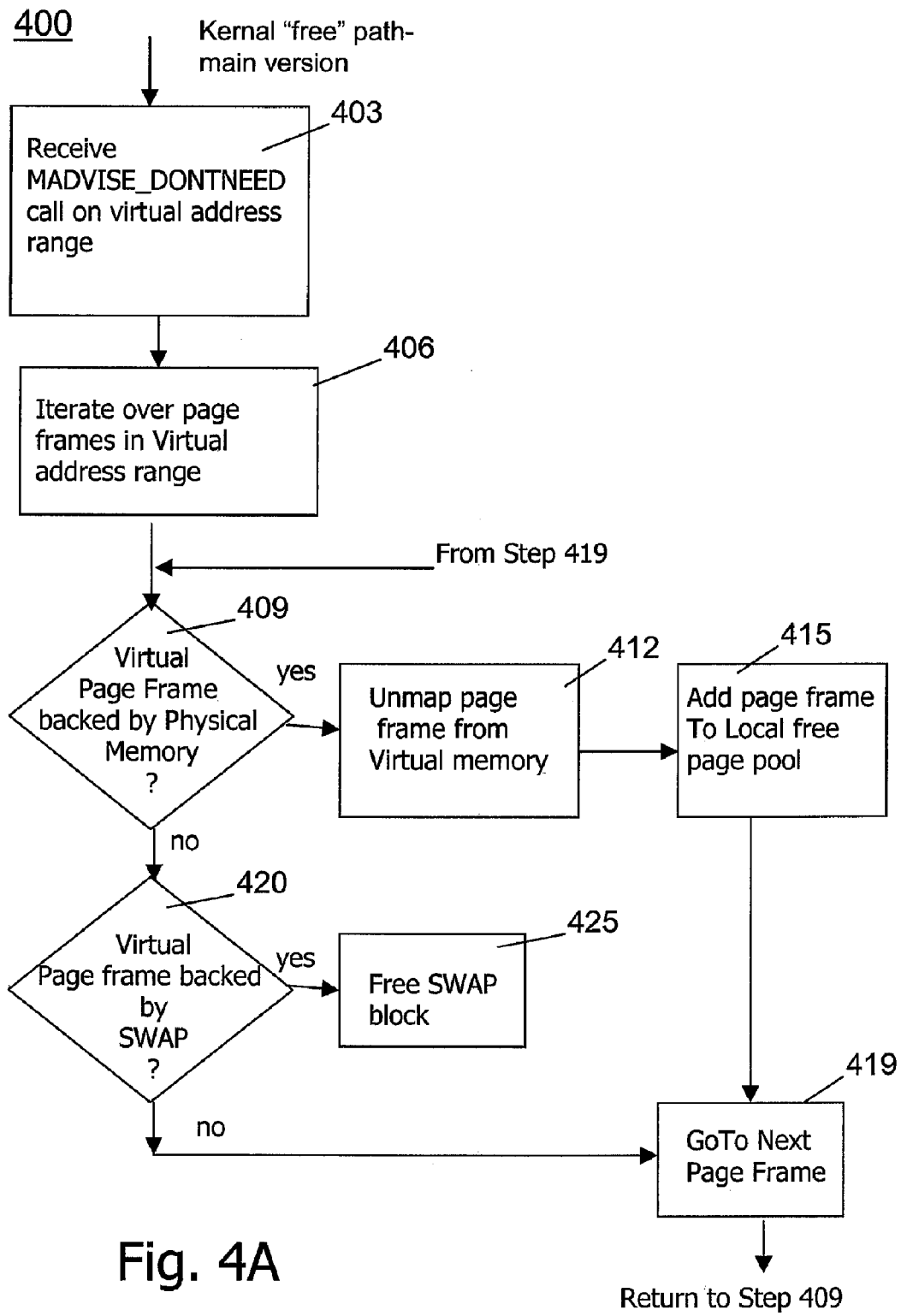
FIGS. 4A-4C illustrate process flow charts highlighting several of the embodiments for providing application memory allocating efficiencies according to the present invention.

According to one embodiment of the invention, the O/S kernel side provides functionality for marking the recently released memory in response to the POSIX madvise (MADVISE_DONTNEED), or equivalent system call. That is, while the kernel recognizes this as recently freed memory, rather than recycle the data and place the freed memory range in a global free page pool, it implements functions to track the page frames which have been marked as freed by placing these pages in a pool. FIG. 4A depicts one exemplary embodiment of the kernel processing 400 invoked for creating the memory allocation efficiencies according to the present invention. A first step of FIG. 4A depicts the step 403 implemented by the kernel for receiving the POSIX madvise (MADVISE_DONTNEED), or equivalent system call that informs the kernel of the freed virtual address range. Then, in the next step 406, the kernel begins to iterate over each page frame in the virtual address range that has been released. For each page frame, as indicated at step 409, a determination is first made as to whether the page frame is backed by physical memory (i.e., is made resident in physical memory). If it is determined that the released page frame is resident in physical memory, then the kernel processing continues at step 412 where the page frame is unmapped from virtual memory as it would do for normal memory deallocation processing. Then, as indicated at the next step 415, that page frame is added to a local free page pool according to the present invention. Particularly, the kernel keeps track of the page frames that have been indicated in the virtual address range of the received MADVISE_DONTNEED system call, and that have been backed by physical memory, by placing these pages in a local free page pool, such as local free page pools 115, 120 depicted in FIG. 2. Page frame table entries may be configured for indicating that these freed memory pages are associated with a particular pool. As will be explained in greater detail herein, the O/S memory management system tracks organization and contents of local free page pools, e.g., by storing the collection of page frames in each as an array, or preferably, a linked list data structure, and maintaining descriptors (attributes) of the pages according to various criteria as will be described. Alternatively, a table or like data structure may be maintained having entries for each physical memory page frame that store the local free page descriptors (attributes) for organizing the freed pages.

The process then repeats at step 419 by returning back to step 409 where the determination is made as to whether the next page frame in the virtual address range is backed by physical memory that can be added to a local free page pool.

Returning back to step 409, if it has been determined that the freed page frame is not resident in physical memory, then the process proceeds to step 420 where a determination is made as to whether the freed virtual page frame is backed by memory in a SWAP memory space e.g., in RAM or disk.

If the freed virtual page frame is backed by memory in a SWAP memory space, then a swap operation is performed to free that SWAP block as indicated at step 425. In this manner, swap I/O is avoided as the data does not need to be preserved anyway. Otherwise, if it is determined at step 420 that the freed virtual page frame is not backed by SWAP memory, the process then repeats at step 419 by returning back to step 409 where the next page frame of the freed virtual memory page range is processed.

Referring back to step 415, FIG. 4A, the local free page pool is created as a repository for freed pages without having to recycle data from the pages. A local free page pool having freed pages available for reuse may be organized according to criteria, including, but not limited to one or more of the following: a process, a user (e.g. user ID), a security context, a processor, an applications node's status as being a Non-Uniform Memory Access (NUMA) node, or, a memory zone where fixed size freed memory units are made available. The local free page pool having freed pages available for reuse may be further divided in multiple "dimensions" at once, based on a combination of the criteria. For example, the freed page frames may be divided into pools based on both the user ID and the NUMA node they belong to.

Figure 4B:
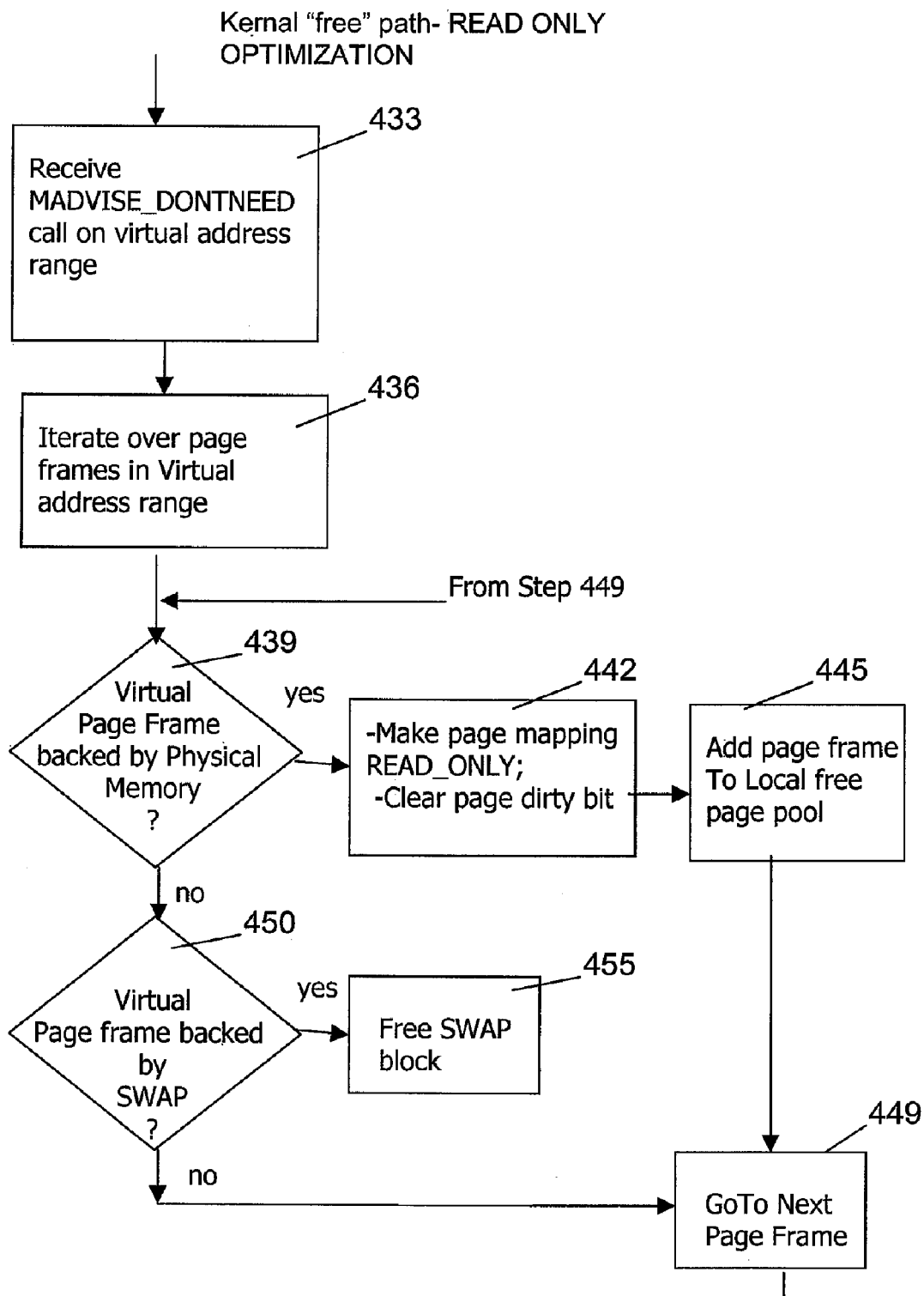

In another configuration optimized for READ-only functionality, a variation of the process depicted in FIG. 4A is now shown and described with respect to FIG. 4B. Particularly, in FIG. 4B, steps 433, 436 and 439 correspond to the respective steps 403, 406 and 409 of FIG. 4A which correspond to steps of receiving the POSIX madvise (MADVISE_DONTNEED), or equivalent system call (step 433), the kernel iterates over each page frame in the virtual address range that have been released (step 436) and, for each page frame, determines whether the page frame is backed by physical memory (step 439). If at step 439 it is determined that the released page frame is backed by physical memory, then the kernel processing continues at step 442 where the page frame is marked as READ-only. This entails implementing functionality by the kernel for setting a READ-only flag in a corresponding entry in the page table to associate READ-only permission with that particular memory page. Further, as indicated at step 442, a page frame "dirty" bit is cleared to indicate that the data does not need to be preserved any more. Then, as indicated at the next step 445, the page frame is added to a local free page pool according to the present invention. Such a local free page pool is depicted in FIG. 2 as local free pools 115, 120 and page table entries may be set for indicating that these freed memory pages are associated with a pool. The process then repeats at step 449 by returning back to step 419 where the next page frame of the freed virtual memory page range is processed according to the READ-only optimization of this aspect of the invention.

In the configuration optimized for READ-only functionality as depicted in FIG. 4B, steps 450 and 455 correspond to the respective steps 420 and 425 of FIG. 4A which correspond to steps of determining whether the freed virtual page frame is backed by memory in a SWAP memory space e.g., in RAM or disk. If the freed virtual page frame is backed by memory in a SWAP memory space, then a swap operation is performed to free that SWAP block as indicated at step 455. Otherwise, if it is determined at step 450 that the freed virtual page frame is not backed by SWAP memory, the process then repeats at step 449 by returning back to step 439 where the next page frame of the freed virtual memory page range is processed.

Figure 4C:
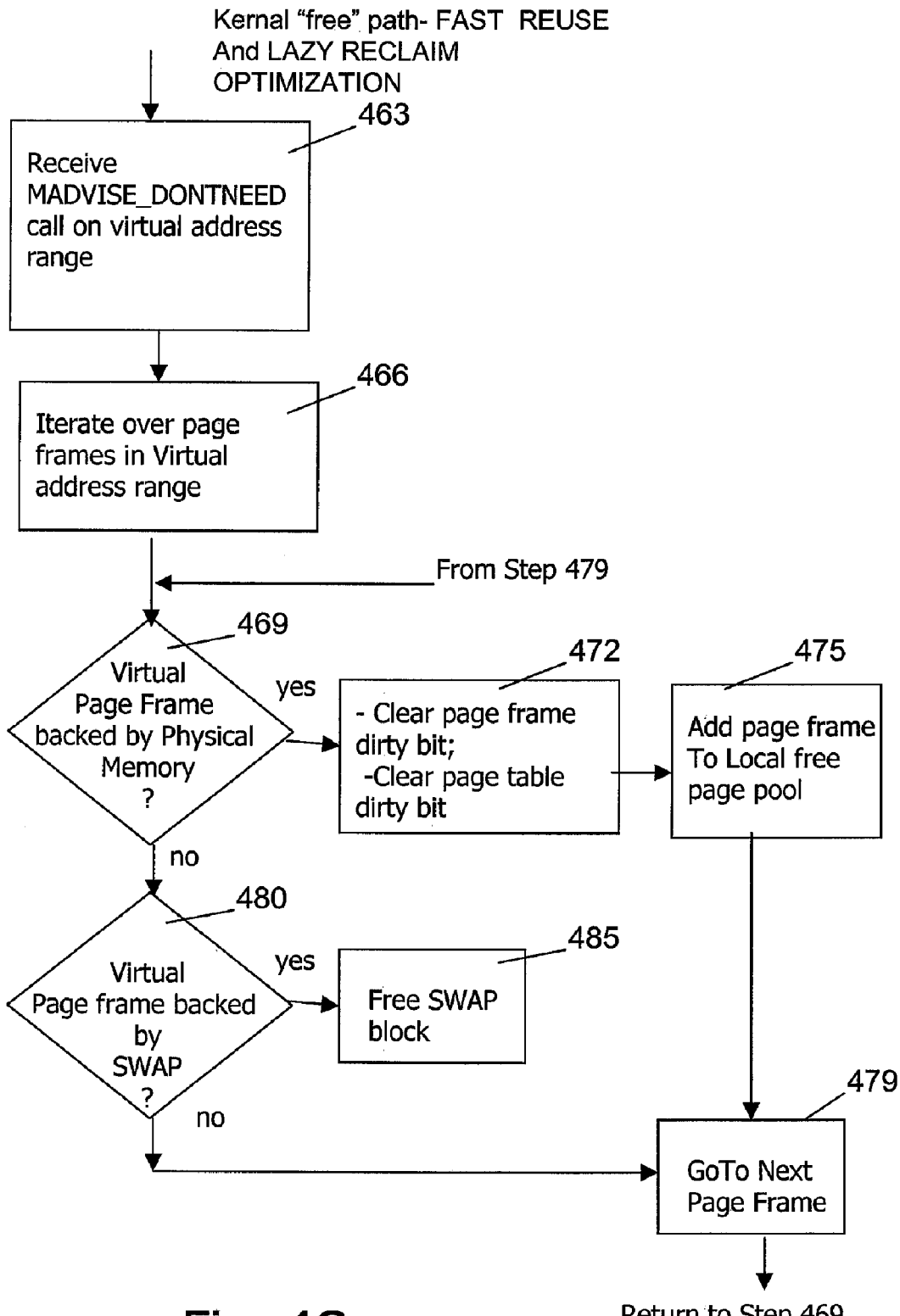

In a further configuration optimized for FAST REUSE and LAZY RECLAIM functionality, a variation of the process depicted in FIG. 4A is now shown and described with respect to FIG. 4C. Particularly, in FIG. 4C, steps 463, 466 and 469 correspond to the respective steps 403, 406 and 409 of FIG. 4A which correspond to steps of receiving the POSIX madvise (MADVISE_DONTNEED), or equivalent system call (step 463) that informs the kernel of the freed virtual address range. In response, the kernel begins iterating over each page frame in the virtual address range that have been released (step 466) and, for each page frame, determining whether the page frame is backed by physical memory (step 469). If at step 469 it is determined that the released page frame is backed by physical memory, then the kernel processing continues at step 472 where functionality is executed by the kernel for clearing a page table "dirty" bit, i.e., setting it to zero, to indicate that a program has not written any new data into the freed page. Additionally, at step 472, a page frame "dirty" bit is cleared to indicate that the data of that page needs not be preserved any more. Then, as indicated at the next step 475, the page frame is added to a local free page pool construct according to the present invention. Such a local free page pool is depicted in FIG. 2 as local free pools 115, 120. The process then repeats at step 479 by returning back to step 469 where the next page frame of the freed virtual memory page range is processed according to the FAST REUSE and LAZY RECLAIM optimization of this aspect of the invention.

In the configuration optimized for FAST REUSE and LAZY RECLAIM functionality as depicted in FIG. 4C, steps 480 and 485 correspond to the respective steps 420 and 425 of FIG. 4A which correspond to steps of determining whether the freed virtual page frame is backed by memory in a SWAP memory space e.g., in RAM or disk.

If the freed virtual page frame is backed by memory in a SWAP memory space, then a swap operation is performed to free that SWAP block as indicated at step 485. Otherwise, if it is determined at step 480 that the freed virtual page frame is not backed by SWAP memory, the process then repeats at step 479 by returning back to step 469 where the next page frame of the freed virtual memory page range is processed.

Figure 5A:
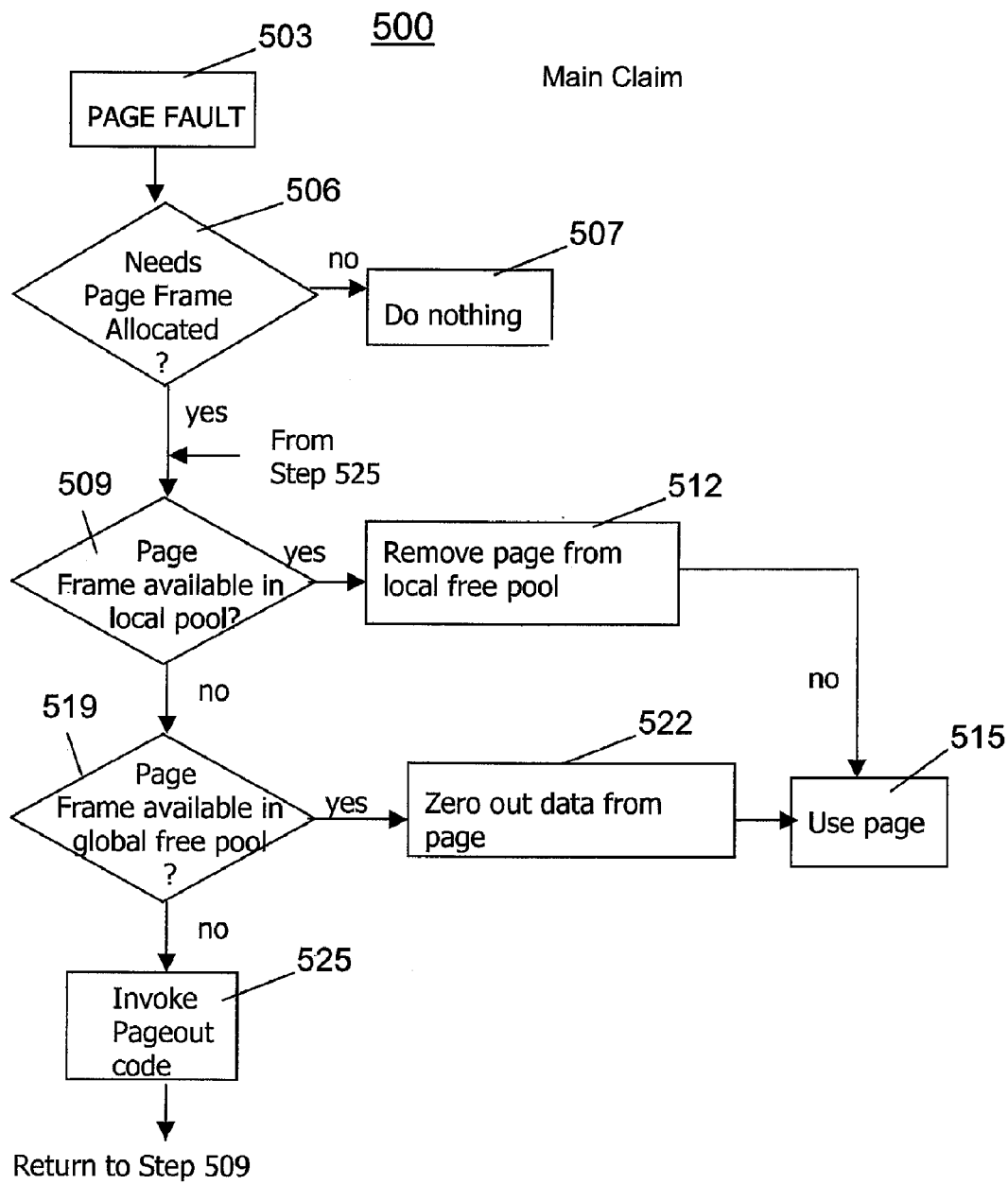
FIGS. 5A-5C illustrate process flow charts highlighting the techniques for allocating memory for the embodiments of the invention depicted in FIGS. 4A-4C, respectively.
Figure 5B:
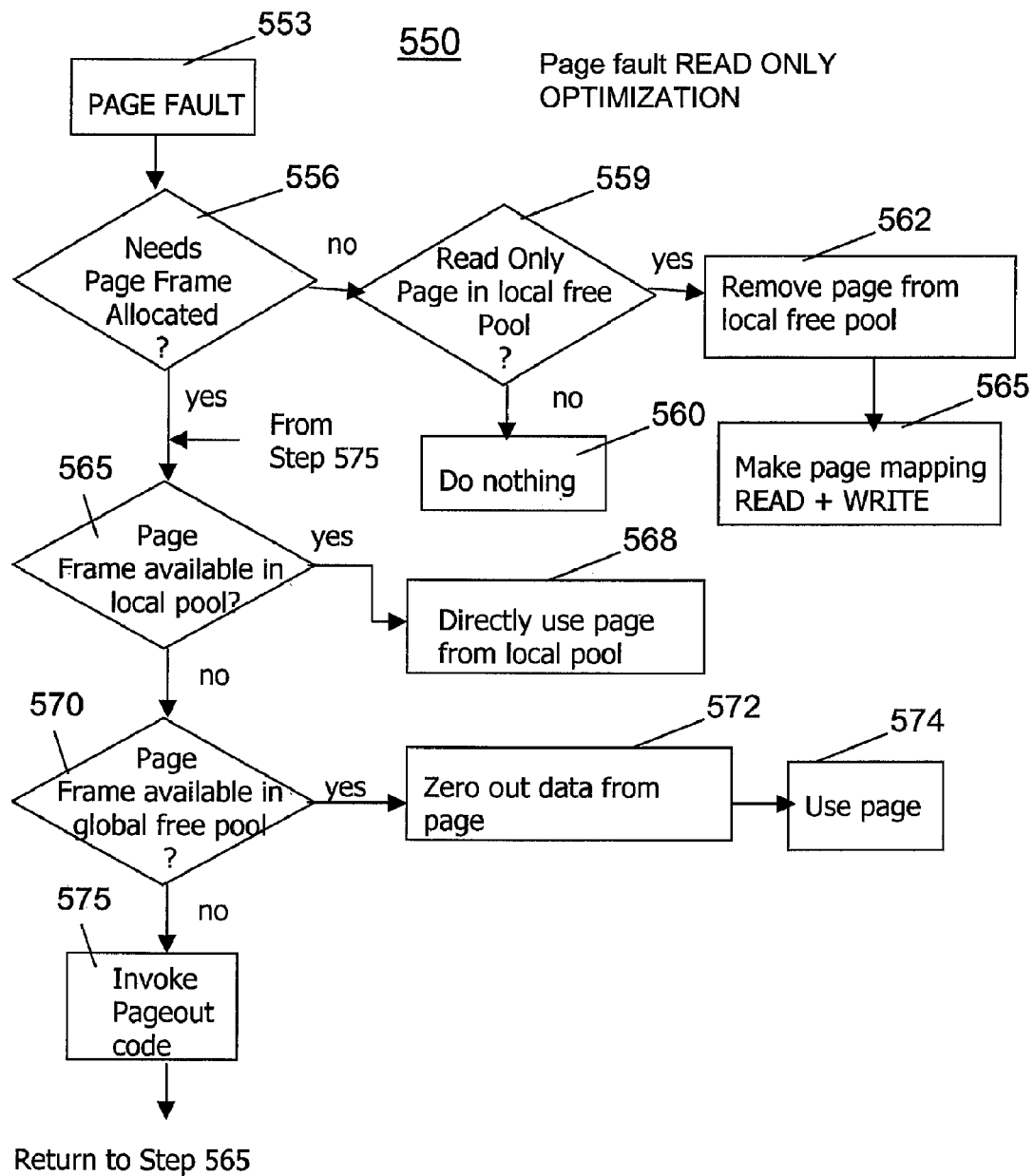
Figure 5C:
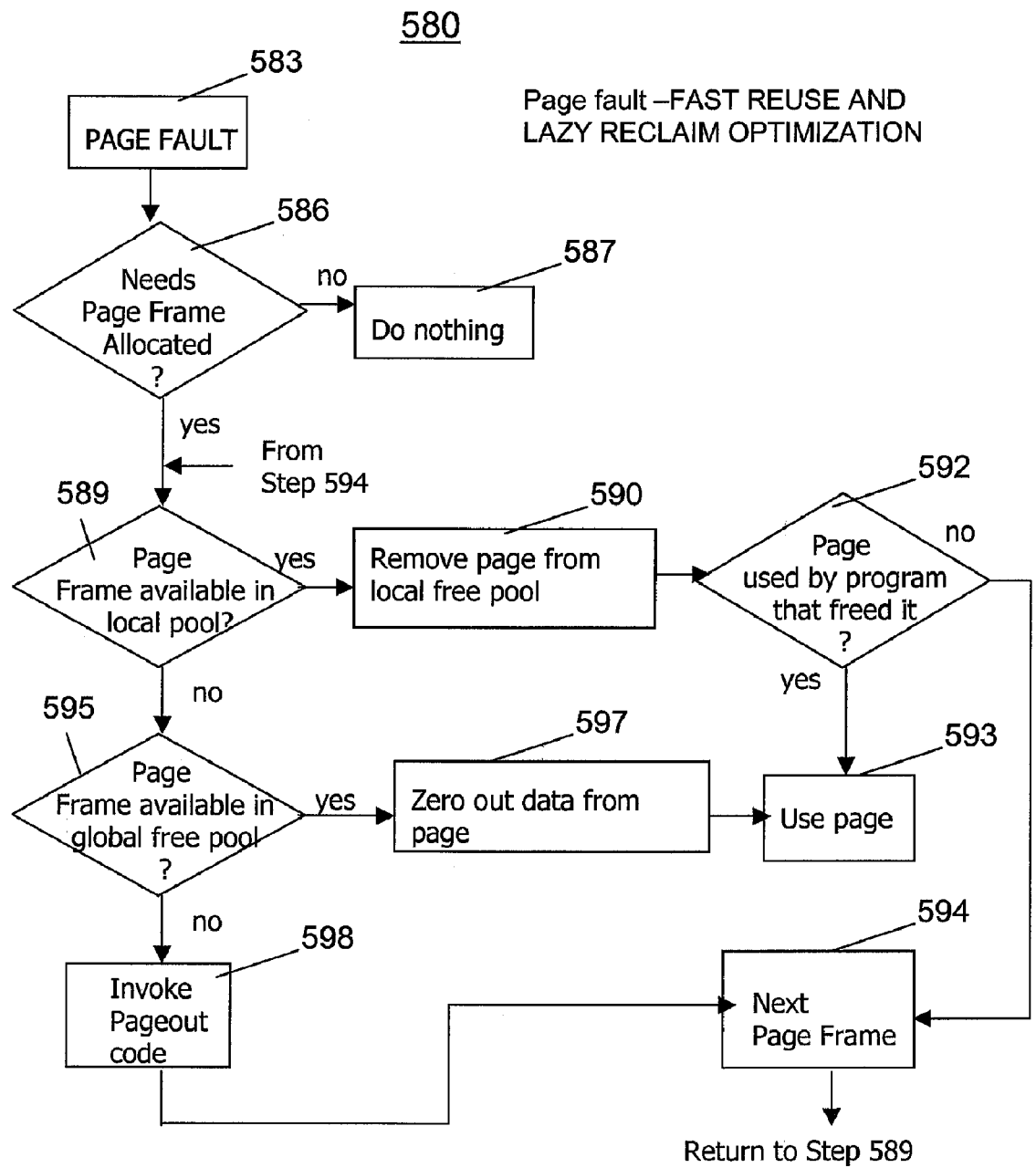

FIGS. 5A-5C depicts the techniques for allocating memory for the respective embodiments of the invention depicted in FIGS. 4A-4C. Central to the embodiments depicted in FIGS. 5A-5C is that when a process, application, program or other entity allocates memory, if there are page frames available in a suitable pool, they can be allocated to the entity, and the kernel can skip the deletion of the old data in those page frames. In this context, a "suitable" pool is a local free memory page frame that has been created by an entity according to one or more criteria described herein so that the entity that allocated memory can look at the previous data in these page frames without there being a security problem. Alternately, or in addition, the determination of a "suitable" pool could be further narrowed down by other criteria, like SMP processor affinity, NUMA node affinity, or a security context.

Thus, in FIG. 5A, there is depicted a method 500 for handling memory allocations according to the invention. The embodiment depicted in FIG. 5A corresponds to the exemplary embodiment of the kernel processing 400 invoked for creating the memory allocation efficiencies according to FIG. 4A. A first step 503 depicts a step of the O/S receiving a memory page fault interrupt indicating that content at a requested virtual memory address is not present in main memory.

As known, the computer executes computer readable instructions, and provides data structures, system library modules and interfaces that enable the memory management system to handle invalid page faults caused when an application or process attempts to store or call a segment of the computer's memory that does not exist. In the context of the present invention depicted in FIG. 5A, this occurs when an application or process requires access to memory that it had previously freed and subsequently been associated with a local free page pool in the same memory area or another previously freed memory area. Continuing in FIG. 5A, a next step 506 comprises making a determination whether the memory request demands that one or more page frames be allocated. If at step 506 it is determined that no page frame needs to be allocated, then no action is taken as indicated at step 507. If at step 506 it is determined that one or more page frames need to be allocated, the process continues to step 509 to determine if one or more page frames are available in a local memory pool that has been created for that requesting process according to one of the various criteria described. For example, a local free page pool may have been created for that process, particular user, a processor or entity of like security context who is now attempting to access memory from its associated local free page pool. If, at step 509, it is determined that one or more page frames are available in the local memory pool, the process continues to step 512 where that page(s) is removed. As no security issues or stale data issues exist with respect to the content of the pages in the local free page pool, the requesting entity may immediately begin to use the memory page, as indicated at step 515, FIG. 5A. It is understood that, according to the invention, placement of memory page frames in local page pools obviate the need to recycle or zero contents of those pages prior to their allocation. However, if it is determined that there are no page frames available in a suitable "freed pages" pool, the kernel uses page frames from the system-wide free memory list and any data in this memory needs to be deleted, for security purposes. Thus, referring back to step 509, if it is determined that one or more page frames are not available in the local memory pool, the process continues to step 519 where a determination is made as to whether one or more page frames are available in the global memory pool. If, at step 519, it is determined that one or more page frames are available in the global free pool, the process continues to step 522 where that data content from that page is recycled, i.e., zeroed out. Zeroing out of data content for these requested pages is accomplished according to well known techniques and is necessary to ensure that no security issues exist with respect to the data content of the pages in the global free page pool. Only after zeroing out data content of these requested pages will the process then proceed to step 515 where the requesting entity may immediately begin to use the memory page. Referring back to step 519, if it is determined that one or more page frames are not available in the global free pool, then the computing system's memory management feature will invoke pageout operations to free up additional memory space to satisfy the request as indicated at step 525. The process then returns to step 509 to process the additional request for further memory page frames.

As will be described, in greater detail herein with respect to FIG. 6, if the system-wide (global) free memory list indicates low supply of free pages (or is empty of free pages), the system's pageout mechanism has been adapted to attempt to reclaim pages from a "free" pages pool, before falling back to paging out data from occupied page frames.

Returning to FIG. 5B depicts a method 550 for handling memory allocations for memory page faults that would occur when memory has been allocated according to the embodiment optimized for READ-only functionality as depicted in FIG. 4B. A first step 553 depicts a step of the O/S receiving a memory page fault interrupt indicating that content at a requested virtual memory address is not present in main memory. A next step 556 comprises the O/S making a determination whether a processes memory request demands that one or more page frames be allocated. If at step 556 it is determined that no page frame needs to be allocated, then the process proceeds to step 559 where a determination is made as to whether any READ-only pages are present in a local free page memory pool associated with that process or another process of like security context. If, at step 559, it is determined that no READ-only pages are present in a local memory pool, then no action is taken as indicated at step 560. If, at step 559 it is determined that one or more READ-only pages are present in a local memory pool, then those pages are removed from the free local memory pool as indicated at step 562. The process then proceeds to step 565 where the removed page frame is allocated both read and write access permissions. Returning to step 556, if it is determined that page frames need to be allocated, then the process proceeds to step 565 where a determination is made as to whether one or more page frames are available in a local memory pool that has been created for that requesting process according to one of the various criteria described. For example, a local free page pool may have been created for a process, a particular user, a processor or entity of like security context who is now attempting to access memory from its associated local free page pool. If, at step 565, it is determined that one or more page frames are available in the local memory pool, the process continues to step 568 where that page(s) is(are) allocated directly from the local pool to satisfy the memory request. Otherwise, returning to step 565, if it is determined that one or more page frames are not available in the local memory pool, the process continues to step 570 where a determination is made as to whether one or more page frames are available in the global free memory pool. If, at step 570, it is determined that one or more page frames are available in the global free memory pool, the process continues to step 572 where that data content from that page is recycled, i.e., zeroed out, to avoid any security issues and/or remove stale data. Only after zeroing out data content of these global pool free memory pages will the process then proceed to step 574 where the requesting entity may immediately begin to use the memory page. Referring back to step 570, if it is determined that one or more page frames are not available in the global free pool, then the computing system's memory management feature will invoke pageout operations to free up additional memory space to satisfy the request as indicated at step 575. The process then returns to step 565 to process the additional request for further memory page frames.

FIG. 5C depicts a method 580 for handling memory allocations for memory page faults that would occur when memory has been allocated according to the embodiment optimized for FAST REUSE and LAZY RECLAIM functionality as depicted in FIG. 4C. A first step 583 depicts a step of the O/S receiving a memory page fault interrupt indicating that content at a requested virtual memory address is not present in main memory. A next step 585 comprises making a determination whether the memory request demands that one or more page frames be allocated. If at step 585 it is determined that no page frame needs to be allocated, then no action is taken as indicated at step 587 as a recently marked freeable page frame was still assigned to a virtual address (the page is still mapped in the process). If at step 585 it is determined that one or more page frames need to be allocated, the process continues to step 589 to determine if one or more page frames are available in a local memory pool that has been created for that requesting process according to one of the various criteria described. For example, a local free page pool may have been created for a process, a particular user, a processor or entity of like security context who is now attempting to access memory from its local free page pool. If, at step 589, it is determined that one or more page frames are available in the local memory pool, the process continues to step 590 where that page(s) is removed from the local pool. Continuing to step 592, a further determination is made as to whether the removed page is being used by the application, program or process that initially freed the page frame. If it is determined at step 592 that the removed page is not being used by the application, program or process that initially freed the page frame, then the process continues to step 594 where an attempt is made to remove the next page frame from the local free memory pool for processing by returning to step 589. Otherwise, returning to step 592, if it is determined that the removed page is to be used by the application, program or process that initially freed the page frame, the process proceeds to step 593 where the requesting entity may immediately begin to use the removed memory page. Returning to step 589, if it is determined that one or more page frames are not available in the local memory pool, the process continues to step 595 where a determination is made as to whether one or more page frames are available in the global memory pool. If, at step 595, it is determined that one or more page frames are available in the global free pool, the process continues to step 597 where that data content from that page is recycled, i.e., zeroed out, to avoid any data security issues. Only after zeroing out data content of these global pool free memory pages will the process then proceed to step 593 where the requesting entity may immediately begin to use the memory page. Referring back to step 595, if it is determined that one or more page frames are not available in the global free pool, then the computing system's memory management feature will invoke pageout operations to free up additional memory space to satisfy the request as indicated at step 598. The process then returns to step 594 to process the additional request for further memory page frames.

Figure 6:
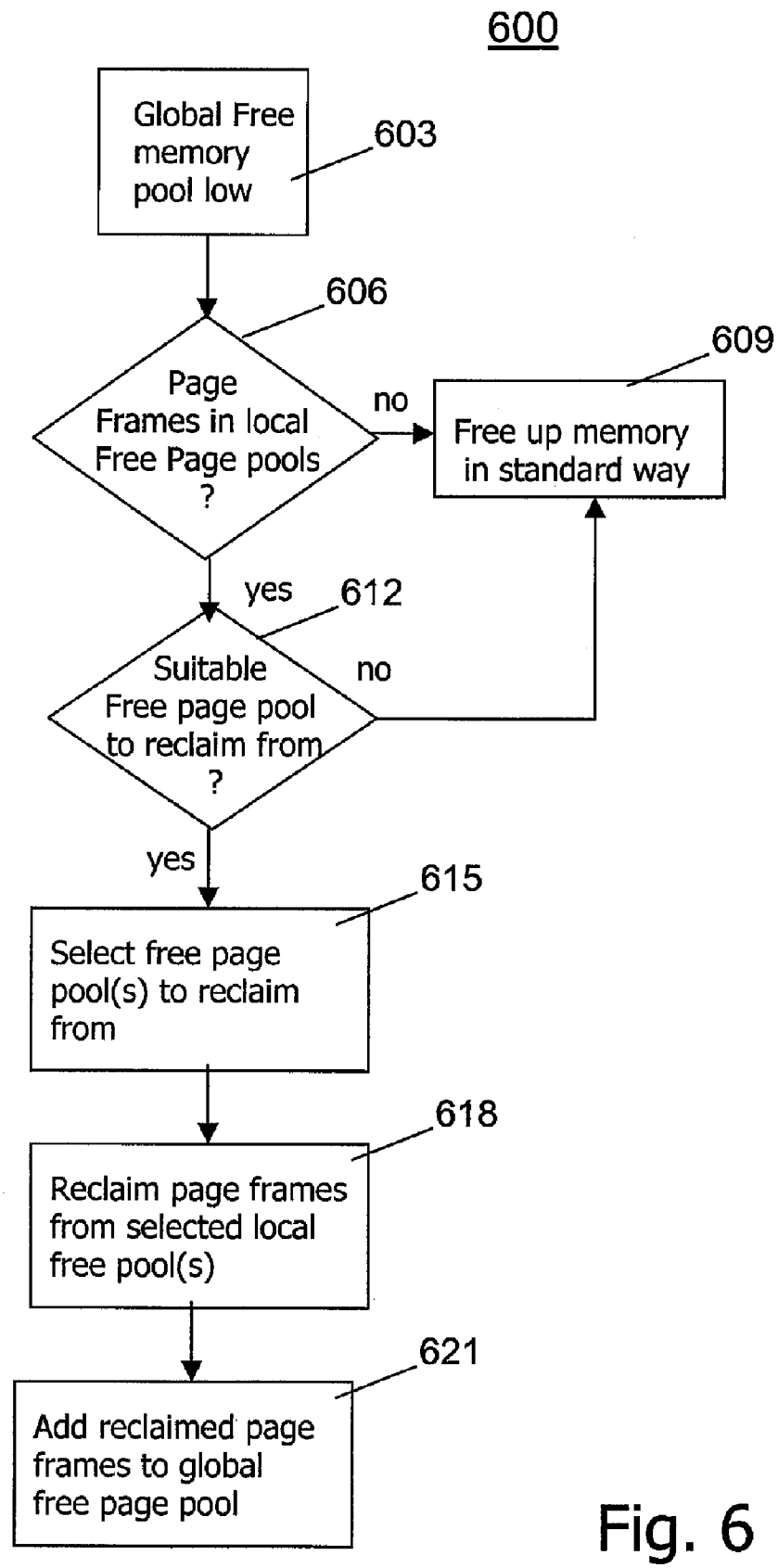
FIG. 6 illustrates a process flow chart depicting the adaptation of pageout code enabled to first reclaim pages from a free pages pool, before falling back to paging out data from occupied page frames; and, FIG. 7 depicts a process flow depicting a smart implementation of the invention for determining alternate methods for freeing pages of memory.

Referring now to FIG. 6 there is depicted a process flow chart 600 illustrating the adaptation of the system pageout code thread for reclaiming pages from a free pages pool, before falling back to paging out data from occupied page frames when the system-wide (global) free memory is low. The process depicted in FIG. 6 thus comprises an enhancement of the method performed in steps 525, 575 and 598 of FIGS. 5A, 5B and 5C, respectively.

As shown in FIG. 6, a first step 603 depicts the step of the O/S memory management process determining that the system-wide global free memory pool is below a certain threshold. In response, at step 606, a determination is made as to whether "freed" page frames are available in local free page pools. If at step 606 it is determined that page frames are not available in local free page pools, then the process proceeds to step 609 where memory is freed in a standard way, e.g., memory management feature of conducting pageout operations as well-known in the art. Otherwise, returning to step 606, if it is determined that page frames are available in local free page pools, then the process proceeds to step 612 where a "suitable" free page pool is determined from which page frames may be reclaimed. If at step 612 it is determined that there are no suitable free page pools from which page frames may be reclaimed, then the process continues to step 609 where memory is freed according to known techniques. Otherwise, if at step 612 it is determined that there are suitable free page pools from which page frames may be reclaimed, then the process continues to step 615 where a selection is made of the suitable free page pool from which page frames are to be reclaimed. In this respect, the kernel's pageout code takes into account various criteria when choosing from which "freed pages" pool(s) to reclaim page frames. This criteria includes, but is not limited to: 1) the size of the freed pages pool; 2) the allocation rate from the pool; 3) the rate at which memory is freed into the pool; 4) the net allocation rate (allocation rate—free rate) of the free pages pool; and/or 5) how long the memory has been sitting in the pool, or combinations thereof. Continuing to step 618, the page frames are then reclaimed from the selected free page pool(s). Finally, as indicated at step 621, the reclaimed page frames are added back into the global free page pool.

In a further optimization of the pageout feature, if an existing process needs to be allocated a further amount of memory, based on the requesting process and with knowledge of the associated requesting user, processor or security context, the O/S will determine from which suitable local free page pool a freed page frame may be allocated from without having to clean the old data out of the page frame.

Moreover, in the embodiment of the invention providing the READ-only optimization, the kernel may leave the freed page frame mapped into process virtual memory space, while disabling the ability to write to the page frame. If the process allocates the same virtual memory again, the kernel only needs to re-enable write access in order for the page frame to be reused. However, if the process allocates memory elsewhere in its virtual address space, the kernel may "move" the page to appear in the new virtual address. Both of these operations are simpler than allocating a completely new page and cleaning out its old data.

Alternately, the kernel could leave the "freed" page frame mapped into process virtual memory space. If and when that page is about to be reused by another allocation, the kernel, in this instance, will check the page table accessed and/or dirty bits to see if the process reused the page frame for another reason before the kernel tried reallocating it.

A further optimization according to the invention is available such as: providing the freed page frame of a terminating (e.g., exiting) process to that process's "parent" process, if there are no security issues (e.g., according to the child process's set user-ID (SUID) or, by being part of a program that runs in the same security group). Alternatively, rather than giving the free page frames up to a process's parent process, one implementation of the invention alternately frees the pages into the global page pool on process exit, if it can be performed faster on the computer system.

Figure 7:
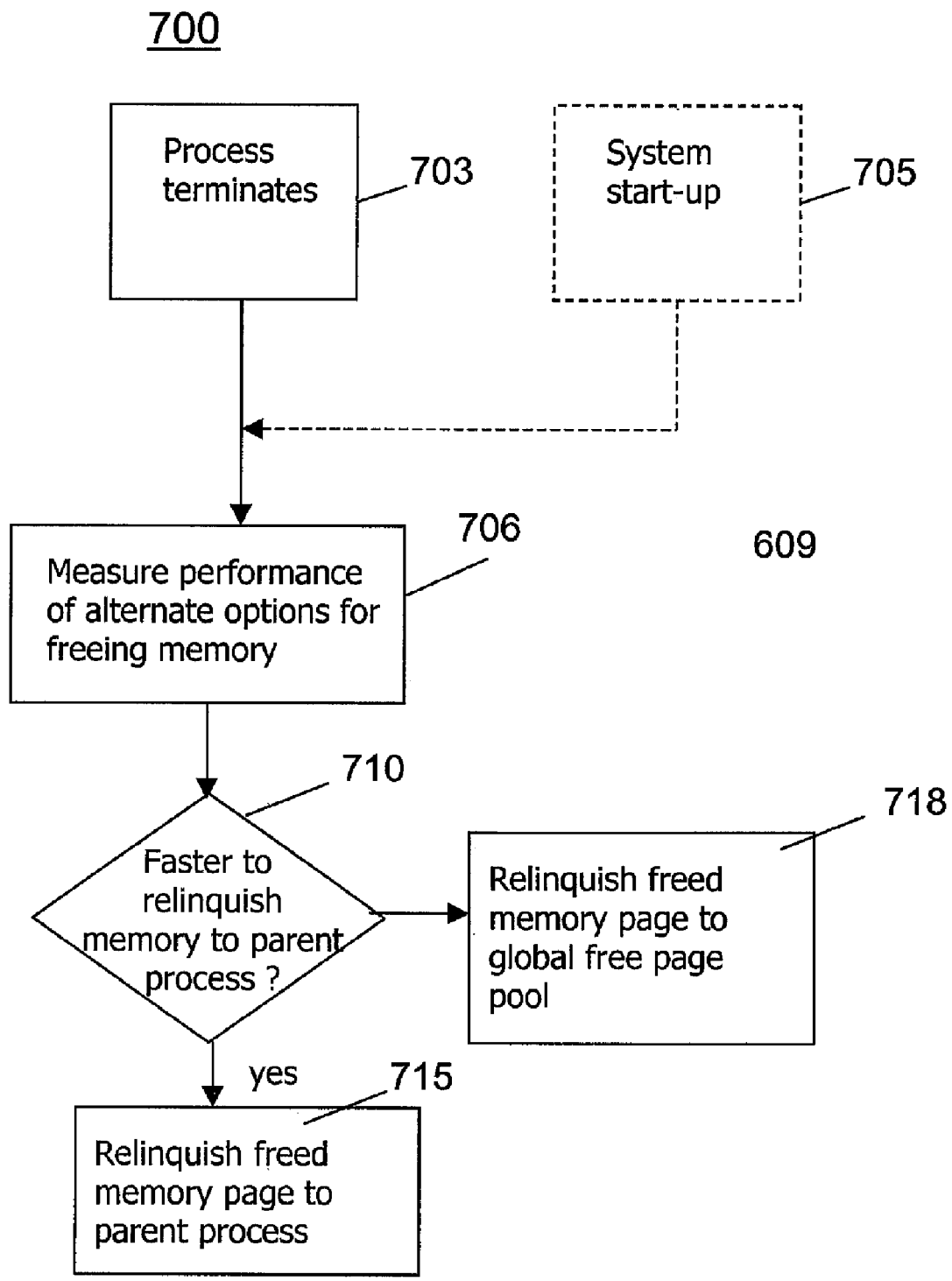

FIG. 7 depicts a process flow depicting a smart implementation of the invention for determining which of these alternate methods for freeing pages of memory to implement depending upon which method performs faster. Thus, in FIG. 7 during run-time, after determining that a process is terminating and is about to relinquish its memory pages at step 703, or alternatively, at system start-up as indicated at step 705, a step 706 is performed to ascertain which implementation of freeing memory is faster: the implementation whereby the page frames of a terminating process are released to its parent process, or, immediately freeing the pages into the global page pool. Then at step 710, a determination is made as to whether the implementation of releasing freed memory to a parent process is faster. If it is determined that the method for freeing memory to a parent process is faster than relinquishing the memory to the global free page pool, then at step 715, the terminating process releases its freed memory page(s) to its parent process. Otherwise, if it is determined that the method for freeing memory to the global free page pool is faster than relinquishing the memory to a terminating process's parent process, then at step 718, the terminating process will release its freed memory page(s) to the global free page pool. Thus, in a smart implementation of the present invention depicted in FIG. 7, a choice is made between these two methods depending on which method is faster. In a further alternate embodiment, this optimization may be hard-coded into the kernal, depending on the hardware model it is running on.

In a further optimization, a page may be recycled on CPUs with optimized write allocate avoidance. That is, the present invention is adapted to allocate space in a (much faster) CPU cache such that a write to a page of memory occurs without that write ever hitting main memory (RAM). This optimization for recycling a page (zeroing) occurs in the CPU cache, and does not need to touch main memory. When recycling a page on the CPU cache without optimized write allocate avoidance, the to be recycled page can be reused without zeroing out the previous contents.

According to a further aspect of the invention, a smart implementation is provided that can choose between these two methods depending on which method is faster. Referring to FIG. 7, the performance of the two methods can be measured at system startup time, or at run time, when the invention is first used. Alternately, this implementation can choose the method based on a particular machine or CPU model or vendor ID.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention.

What is claimed is:

1. A method for managing memory freed by processes executing in a virtual memory space in a computer system implementing means for mapping virtual memory addresses into physical memory locations accessible by an operating system (O/S), said method comprising:
   receiving, by said O/S, an indication of freed memory in said virtual memory space that spans one or more fixed size memory units in physical memory;
   adding said fixed size memory units to a free memory pool, said fixed size memory units in a free memory pool being directly allocatable to a process requiring backing physical memory store without the 0/S deleting data in the freed fixed size memory units; and
   maintaining information about said process and one or more free memory pools having fixed size memory units, said information used to directly allocate said freed fixed size memory units to a process, wherein said fixed size memory unit comprises a physical memory page frame, and prior to said O/S adding one or more fixed size memory units into a free memory pool, unmapping a physical memory page frame from virtual memory space.

2. The method as claimed in claim 1, wherein said fixed size memory unit comprises a physical memory page frame, and prior to said O/S adding one or more fixed size memory units into a free memory pool, rendering said physical memory page frame as available for reuse by a process while leaving said physical memory page frame mapped to said process's virtual memory space.

3. The method as claimed in claim 2, wherein said O/S receives a page fault exception, and in response, said O/S: determining whether a free memory pool includes a physical memory page available for reuse, and if said free memory pool includes a physical memory page frame available for reuse: removing said page from said free memory pool; determining whether the freed memory page is to be used by a process that freed it, and allocating said page if said page is to be used by said freeing process.

4. The method as claimed in claim 3, wherein if it is determined that a memory page frame is not available for reuse in said free memory pool: determining if a memory page frame is available in a system wide free memory pool, and if a page frame is available in a system wide free memory pool, deleting data included in said memory page frame; and allocating memory page frames from a system wide free memory pool for said process.

5. The method as claimed in claim 4, wherein if a memory page frame is not available in a system wide free memory pool, invoking pageout mechanism for increasing availability of system-wide free memory pages.

6. The method as claimed in claim 1, wherein said O/S receives a page fault exception, and in response, said O/S: determining if a pool having freed memory units will not result in a data security breach if data included in said freed memory units corresponding to said pool is accessed by said process; and if no data security breach results, allocating one or more freed memory page frames of that pool for said process without the O/S expending overhead of deleting data included in said one or more freed memory units.

7. The method as claimed in claim 6, wherein if no free page is available in a suitable free page pool: determining if a memory page frame is available in a system wide free memory pool, and if a page frame is available in a system wide free memory pool, deleting data included in said memory page frame; and allocating memory page frames from a system wide free memory pool for said process.

8. The method as claimed in claim 7, wherein if a memory page frame is not available in a system wide free memory pool, invoking pageout mechanism for increasing availability of system-wide free memory pages.

9. The method as claimed in claim 1, wherein said O/S tracks fixed size memory units that are available system-wide, said method including: determining whether an amount of fixed size memory units tracked system-wide is below a threshold amount.

10. The method as claimed in claim 9, further comprising: the step of releasing said freed fixed size memory units into a system wide free memory pool when a process terminates, wherein said freed fixed size memory units of said system-wide free pool are available system-wide.

11. The method as claimed in claim 10, wherein said process having freed fixed size memory units marked available for reuse is associated with an executing parent process, wherein when said process terminates, said method further comprising: comparing computer system performance for executing a step of releasing said freed fixed size memory units marked available for reuse by a terminating process to its parent process against a computer system performance for executing a step of releasing said freed fixed size memory units marked available for reuse into a global free pool of fixed size memory units when said process terminates; and choosing a method of releasing said freed fixed size memory units marked available for reuse according to said performance comparison.

12. The method as claimed in claim 11, wherein said comparing comprises: measuring the computer system performance for releasing said freed fixed size memory units marked available for reuse at one of: a computer system start-up time, or at a computer system run time when said freed fixed size memory units marked available for reuse are to be allocated.

13. The method as claimed in claim 9, wherein if said amount of fixed size memory units tracked system-wide is below a threshold amount said O/S: determining if a suitable free page pool to reclaim freed fixed size memory units from; and, reclaiming said freed fixed size memory units from that free memory pool.

14. The method as claimed in claim 13, wherein said freed memory units designated as available for reuse from a pool are reclaimed based on criteria including at least one of: a size of said free memory pool; an allocation rate from the pool; a rate at which memory is freed into the pool; a net allocation rate of the pool; and a length of time memory has been assigned to the pool.

15. The method as claimed in claim 13, wherein if it is determined that no page frames are available in said free memory pools, or no suitable free page pool exists to reclaim freed memory pages from, then invoking pageout mechanism for increasing availability of system-wide free memory pages.

16. The method as claimed in claim 9, wherein a process having freed fixed size memory units marked available for reuse is associated with an executing parent process, wherein upon determination of said process terminating, said method further comprising the step of: determining that said process does not present a security conflict with said parent process; and, upon determining no security conflict exists, releasing said freed fixed size memory units marked available for reuse to said parent process.

17. A method for managing memory freed by processes executing in a virtual memory space in a computer system implementing means for mapping virtual memory addresses into physical memory locations accessible by an operating system (O/S), said method comprising:
receiving, by said O/S, an indication of freed memory in said virtual memory space that spans one or more fixed size memory units in physical memory;
adding said fixed size memory units to a free memory pool, said fixed size memory units in a free memory pool being directly allocatable to a process requiring backing physical memory store without the O/S deleting data in the freed fixed size memory units; and
maintaining information about said process and one or more free memory pools having fixed size memory units, said information used to directly allocate said freed fixed size memory units to a process, wherein said fixed size memory unit comprises a physical memory page frame, and prior to said O/S adding one or more fixed size memory units into a free memory pool, designating said physical memory page frame as read-only by a process while leaving said physical memory page frame mapped to said process's virtual memory space.

18. The method as claimed in claim 17, wherein said O/S receives a page fault exception, and in response, said O/S: determining whether a memory page frame needs to be allocated, and, if a memory page frame does not need to be allocated, then: determining whether a free memory pool includes a physical memory page frame designated as read-only by said process, and if said free memory pool includes a physical memory page frame designated as read-only, removing said page from said free memory pool and designating said memory page frame as available for reuse by re-enabling a process's write access to its associated memory page frames.

19. The method as claimed in claim 18, wherein if it is determined that a memory page frame needs to be allocated, said O/S: determining if a memory page frame is available for reuse in said free memory pool; and, allocating said freed memory page frame of that pool for said process.

20. The method as claimed in claim 19, wherein if it is determined that a memory page frame is not available for reuse in said free memory pool: determining if a memory page frame is available in a system wide free memory pool, and if a page frame is available in a system wide free memory pool, deleting data included in said memory page frame; and allocating memory page frames from a system wide free memory pool for said process.

21. The method as claimed in claim 20, wherein if a memory page frame is not available in a system wide free memory pool, invoking pageout mechanism for increasing availability of system-wide free memory pages.

22. The method as claimed in claim 18, wherein if it is determined that a memory page frame needs to be allocated, said O/S determining whether said process allocates memory elsewhere in its virtual memory space, said O/S further: unmapping said freed page frame associated with that page frame's old virtual memory address in the process's virtual memory space, and marking said freed page frame as no longer available for reuse, and, mapping said freed page frame associated with said process to a new virtual address.

* * * * *